US005504501A

United States Patent [19]

Hauck et al.

[11] Patent Number: 5,504,501
[45] Date of Patent: Apr. 2, 1996

[54] OPTICAL INPUT ARRANGEMENT AND METHOD OF USING SAME

[75] Inventors: Lane T. Hauck, San Diego; Leonid Shapiro, Lakeside, both of Calif.

[73] Assignee: Proxima Corporation, San Diego, Calif.

[21] Appl. No.: 276,568

[22] Filed: Jul. 18, 1994

Related U.S. Application Data

[63] Continuation of Ser. No. 3,304, Jan. 12, 1993, abandoned, which is a continuation-in-part of Ser. No. 829,880, Feb. 3, 1992, abandoned, which is a continuation-in-part of Ser. No. 656,803, Feb. 14, 1991, abandoned, which is a continuation-in-part of Ser. No. 433,029, Nov. 7, 1989, abandoned.

[51] Int. Cl.$^6$ .................................................. G09G 5/08
[52] U.S. Cl. ......................... 345/158; 345/157; 345/9
[58] Field of Search .................................. 345/157, 156, 345/158, 169, 180; 359/142, 443, 448, 449, 459; 356/375; 348/734, 744; 434/323, 324, 337; 353/122, 28, 43, 42

[56] References Cited

U.S. PATENT DOCUMENTS

| | | | |
|---|---|---|---|
| 3,885,096 | 5/1975 | Inuiya | 340/705 |
| 4,280,135 | 7/1981 | Schlossberg | 358/93 |
| 4,768,028 | 8/1988 | Blackie | 340/705 |
| 4,808,980 | 2/1989 | Drumm | 340/707 |
| 4,846,694 | 7/1989 | Erhardt | 340/707 |
| 4,873,398 | 10/1989 | Hubby, Jr. | |
| 4,884,145 | 11/1989 | Kaye et al. | 340/705 |
| 4,930,888 | 6/1990 | Freisleben et al. | 340/705 |
| 4,938,570 | 7/1990 | Majima et al. | 340/706 |
| 4,998,284 | 3/1991 | Bacus et al. | 358/101 |
| 5,115,230 | 5/1992 | Smoot . | |

FOREIGN PATENT DOCUMENTS 60-230228 11/1985 Japan .
2-53131 2/1990 Japan .

*Primary Examiner*—Richard Hjerpe
*Assistant Examiner*—Xiao M. Wu
*Attorney, Agent, or Firm*—Bernard L. Kleinke; Jerry R. Potts; Peter P. Scott

[57] ABSTRACT

An optical input arrangement and method includes an optical device for sensing a projected image and for detecting the presence of a high intensity optical input signal light by discriminating it from the entire projected image and the ambient light reflecting from a viewing surface. A determination is made as to when the differences in intensity of sequentially measured pixel intensity values of the light reflected from the viewing surface exceeds a positive threshold amount and substantially immediately thereafter decreases more than a negative threshold amount, to facilitate an even more precise discrimination between the input signal image and the overall projected image. An alignment device generates an optical signal for facilitating the alignment of the arrangement to capture the entire image reflecting from the viewing surface.

37 Claims, 5 Drawing Sheets

OPTICAL INPUT ARRANGEMENT AND METHOD OF USING SAME

CROSS-REFERENCE TO RELATED APPLICATIONS

This is a continuation of application Ser. No. 08/003,304, filed on Jan. 12, 1993, now abandoned, which is a continuation-in-part of U.S. patent application Ser. No. 07/829,880 filed Feb. 3, 1992 entitled "OPTICAL SYSTEM AUXILIARY INPUT CALIBRATION ARRANGEMENT AND METHOD OF USING SAME", now abandoned, which is a continuation-in-part of U.S. patent application Ser. No. 07/656,803 filed Feb. 14, 1991 entitled "METHOD AND APPARATUS FOR CALIBRATING GEOMETRICALLY AN OPTICAL COMPUTER INPUT SYSTEM", now abandoned, which is a continuation-in-part of U.S. patent application Ser. No. 07/433,029, filed Nov. 7, 1989, entitled "COMPUTER INPUT SYSTEM AND METHOD OF USING SAME", now abandoned. Each of the above patent applications are incorporated herein by reference.

TECHNICAL FIELD

This invention relates to the general field of an optical input arrangement and a method of using such an arrangement. More particularly, the present invention relates to an auxiliary optical computer input system to facilitate recognition of an auxiliary optical input in a more precise and accurate manner.

BACKGROUND ART

In the past, projecting images onto a projection screen or other surface for viewing by a large number of people simultaneously, such as with transparencies and an overhead projector, provided a method for disseminating information in an efficient manner. However, because such transparencies were a fixed media, the user making the presentation was extremely limited in changing the form of the presentation except by using a large number of additional transparencies.

The ability of a user to change the form of a given presentation has been expanded significantly. In this regard, with the advancements in liquid crystal technology fixed media transparencies have evolved into dynamic images which are produced under the control of a computer or other video signal producing device. Thus, liquid crystal display panels have replaced the fixed transparencies to permit images, such as computer generated or video images, to be projected onto a screen or other surface for viewing purposes.

The capability of the presentation was expanded again when the user was given the ability to enter information interactively into the system in order to modify images, or generate additional images during the presentation, by simply directing a user controlled auxiliary beam of light onto specific areas of the projected image. In this manner, the user could interact with the computer or other device generating the projected image, in a manner similar to using a computer mouse control.

One such successful optical auxiliary input system is described in greater detail in the above-mentioned U.S. patent application Ser. No. 07/901,253. The optical auxiliary input system described therein includes an arrangement wherein a user directs a high intensity light from a light generating device, such as a flashlight or a laser pointer, onto a relatively lower intensity projected image on a viewing area, such as a screen to provide auxiliary information for the system.

The system includes a video information source, such as a computer, and a display projection arrangement, such as an overhead projector, for projecting images of the video information onto the viewing surface. An image processing arrangement, including an optical sensing device, detects and processes the displayed image reflecting from the viewing surface. Such a system detects the high intensity light images produced by the hand-held light generating device, and discriminates the high intensity light images from background ambient light and light produced by the video information source. In this manner, light signals from the hand-held light generating device can be detected on the viewing surface, and then used by the system for modifying subsequently the projected video information.

The optical input light directed onto the viewing surface is detected by determining that the light intensity reflecting from the viewing surface has exceeded a predetermined reference level. In this regard, the high intensity auxiliary light source produces a brighter intensity light than the intensity of the projected image. While such a technique is satisfactory for most applications, under certain conditions, the high intensity input light shining on the viewing surface can go undetected. In this regard, if the input light is directed onto a portion of the projected image which is of a low intensity, the total light being reflected from the viewing surface will not exceed the predetermined reference, and thus the input light will not be detected. Thus, it would be highly desirable to have an even more precise and accurate detection technique for discriminating the auxiliary input signal from the projected image and the ambient light.

In order to function properly, such an auxiliary optical input system includes an optical sensing device, in the form of a video camera, associated with the image processing arrangement which must be properly aligned with the projected image. In this regard, the image must be completely within the area sensed by the optical sensing device.

In one successful arrangement disclosed in the foregoing U.S. patent application Ser. No. 07/955,831, the optical sensing device was aligned by projecting a bright image from the projection arrangement onto the viewing surface. Sensing and indicating arrangements then determined whether or not the optical sensing device was properly aligned. Proper alignment required that light-to-dark transitions at the borders of the projected image would be as sharp as possible. The sensing and indicating devices would then indicate to the user to adjust the orientation of the optical sensing device until properly aligned. While such an alignment technique has proven to be highly successful, it would be desirable to have a new and improved technique which would be even easier for the user to quickly and easily align the sensing device, such as the video camera, with the projected image on the viewing surface. In this regard, it would be highly desirable to have a technique whereby the user can align the sensing device in a manner of seconds, with little or no effort.

DISCLOSURE OF INVENTION

Therefore, it is the principal object of the present invention to provide a new and improved arrangement and method for detecting an optical input signal projected onto a projected image.

Another object of the present invention is to provide such a new and improved optical input arrangement and method for alignment adjustment in an even more convenient manner.

Briefly, the above and further objects of the present invention are realized by providing a new and improved optical input arrangement and method for improved detection of a high intensity auxiliary optical input signal image reflecting from a viewing surface.

An optical input arrangement and method includes an optical device for sensing a projected image and for detecting the presence of a high intensity optical input signal light by discriminating it from the entire projected image and the ambient light reflecting from a viewing surface. A determination is made as to when the differences in intensity of sequentially measured pixel intensity values of the light reflected from the viewing surface exceed a positive threshold amount and substantially immediately thereafter decreases more than a negative threshold amount, to facilitate an even more precise discrimination between the input signal image and the overall projected image. An alignment device generates an optical signal for facilitating the alignment of the arrangement to capture the entire image reflecting from the viewing surface.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
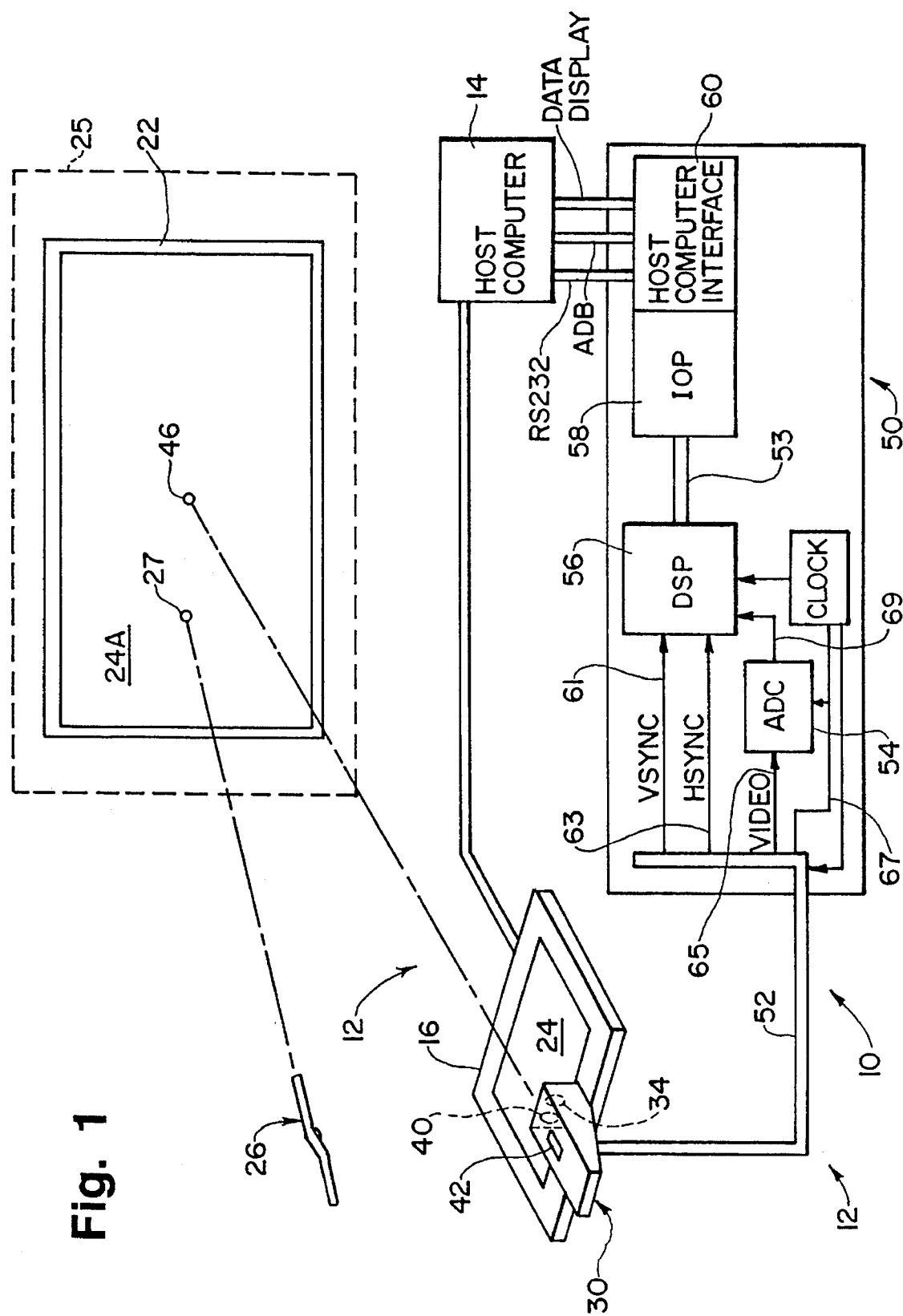
FIG. 1 is a diagrammatic view of an optical input arrangement, which is constructed according to the present invention.

Referring now to the drawings, and more particularly to FIG. 1 thereof, there is illustrated an optical input arrangement, generally indicated at 10, for permitting optical control of an optical auxiliary input system generally indicated at 12, and which is constructed in accordance with the present invention.

The optical input system 12, is more fully described in the above-mentioned U.S. patent application Ser. No. 07/901,253 and includes a video information source, such as a host computer 14, and a liquid crystal display unit 16, for displaying a primary image 24 indicative of the image information generated by the host computer 14. The liquid crystal display unit 16 is positioned on the stage of an overhead projector (not shown) for enabling the image information generated by the computer 14 to be projected onto a viewing surface, such as a screen 22, as a projected image 24A.

The optical input arrangement 10 includes an image processing apparatus 30 having a CCD raster scan charge couple source video camera, indicated at 34, for generating signals indicative of detected images mounted on the unit 16, and a signal processing system 50 coupled to the image processing apparatus 30 for processing the signals for use by the host computer 14. In this way, the optical input arrangement 10 cooperates with a light generating device 26 which generates auxiliary high intensity light information, such as a spot of reflected light 27 directed onto the image 24A, for facilitating the modifying or changing of the primary image information 24 displayed by the liquid crystal display unit 16.

The arrangement 10 also includes an alignment light source 40 (FIGS. 1 and 3) mounted on the front of the image processing apparatus 30 for producing an alignment spot 46 for facilitating alignment of the image processing apparatus 30 with the projected image 24A. In this regard, the alignment light source 40 helps a user align the optical sensing device 34 relative to the projected image 24A, such that the field of view 25 of the device 34 is able to include the complete displayed projected image 24A reflecting from the screen 22.

The device or camera 34 (FIG. 2) senses light reflecting from the screen 22 and generates a reflected light information signal indicative of the luminance levels of the reflected images including other light reflecting from the surface of the screen 22. The optical sensing device 34 as best seen in FIG. 1, has a field of view, indicated generally at 25, that is substantially larger than the primary image 24A.

Figure 2:
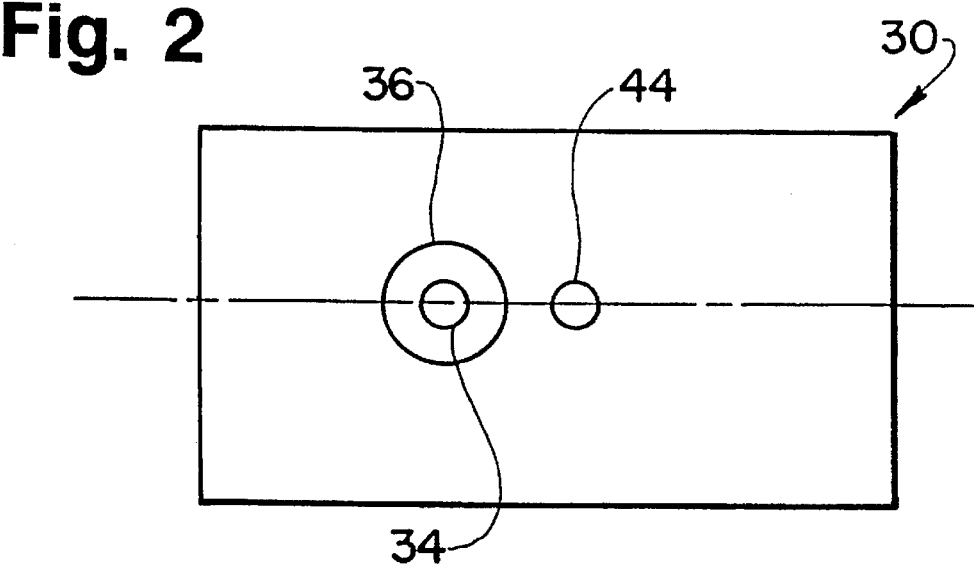
FIG. 2 is a front elevational view of an optical sensing device of the optical input arrangement of FIG. 1.

A band pass filter 36 (FIG. 2) disposed over the lens (not shown) of the device 34 limits the range of wavelengths of light permitted to be sensed by the device 34 (FIG. 2). The optical filter 36 is of the band pass variety, whereby only a selected range of wavelengths of light are permitted to pass therethrough. A preferred range of wavelengths permitted to pass through the filter 36 is between about 660 nanometers and 680 nanometers, and centered about the 670 nanometer wavelength. In this regard, the optical filter 36 excludes all optical light sources outside of the range specified from being sensed by the camera 34.

The light generating device 26 generates an auxiliary optical input or command signal spot 27 as described in U.S. patent application Ser. No. 07/901,253, whose optical wavelength is within the specified range of the band pass filter 36. In this regard, the auxiliary optical command signal spot 27 is sensed by the device 34 while surrounding reflected light of the projected image 24A, whose optical wavelengths is outside of the specified range, is not permitted to be sensed by the camera 34.

In operation, after the image processing apparatus 30 has been pointed towards the screen 22, the user causes the optical auxiliary input system 12 to produce the projected image 24A on the screen 22. As the image processing apparatus 30 is pointed generally toward the screen 22, the apparatus 30 is able to sense the reflected light of the image 24A. In this regard, the reflected light of the primary image 24A generally comprises light substantially from the entire optical wavelength spectrum. Thus, to limit the wavelength spectrum to be sensed by the device 34, the reflected light is first filtered optically by the optical filter 36. In this way, the wavelength of the reflected light permitted to reach the camera 34 is restricted to facilitate the detection of the auxiliary optical input signal spot 27 which is characterized by a very narrow optical wavelength falling within the band of optical wavelengths that filter 36 permits to pass through to the camera 34.

From the foregoing, it will be understood by those skilled in the art, that the filter 36 reduces the amount of extraneous incoming light which will be sensed for detection of the auxiliary optical input signal spot 27.

The image processing apparatus 30 is attached to the liquid crystal display unit 16 in such a way that it may be rotated on both its horizontal and vertical axes. This rotating process is more fully described in U.S. patent application Ser. No. 07/955,831 and will not be described in further detail.

The image processing apparatus 30 generates a video signal indicative of the light reflecting from the screen 22. In this regard, the signal is indicative of the image 24A as well as the light spot 46. This signal is coupled to the signal processing system 50.

When the signal processing system 50 receives the video signal from the device 34, it converts the signal into a digital signal indicative of the luminance level of the image 24A at a given location on the screen 22. In this regard, as the field of view of the device 34 is greater than the site of the image 24A, the device 34 detects the image 24A when properly aligned relative thereto.

Figure 3:
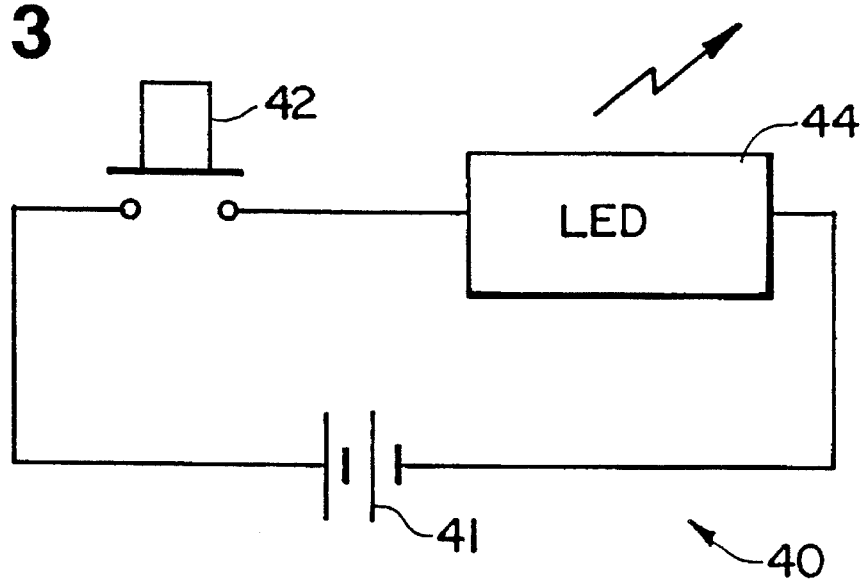
FIG. 3 is a schematic diagram of an alignment generating device of the optical input arrangement of FIG. 1.

Considering now the alignment light source 40 in greater detail with reference to FIG. 3, the light source 40 includes a series arrangement of a source of electrical energy such as a battery 41, a pushbutton 42, and a light emitting diode 44, wherein the pushbutton 42 is disposed between the source 41 and the diode 44 to permit activating and deactivating the diode 44 by depressing or releasing the pushbutton 42. By completing the circuit between the source and the diode 44, the diode is electrically activated and generates the alignment spot 46.

In operation, the alignment light source 40 facilitates the method for aligning the image processing apparatus 30 with the screen 22. In this regard, when the computer 14 commences image 24, the image 24 is projected onto the screen 22 as the projected or primary image 24A by means of the overhead projector (not shown). The user must then align the image processing apparatus 30 in such a way that the primary image 24A is located substantially within the camera field of view 25.

By depressing the pushbutton 42 on the top of the apparatus 30, the alignment spot 46 is generated. The user then manually adjusts the apparatus 30 and the display 16 to position the field of view of the device 34, while simultaneously continuing to depress the pushbutton 42, until the alignment spot 46 is located substantially at the center of the primary image 24A. In this way, the primary image 24A is contained substantially within the camera field of view 25. Once the spot 46 is so located, the user releases the pushbutton 42, to extinguish the alignment spot 46. It should be understood that this alignment operation is performed without the use of the signal system 50 or the host computer 14.

Considering now the signal processing system 50 in greater detail with reference to FIG. 1, the signal processing system 50 is coupled between the image processing apparatus 30 and the host computer 14 for detecting the auxiliary optical command signal spot 27 and for transmitting detection information to the host computer 14. The signal processing system 50 is connected to the image processing apparatus 30 via cable 52.

Cable 52 supplies a variety of signals including a VSYNC signal 61, an HSYNC signal 63, a VIDEO signal 65, and a clock signal 67. The clock signal 67 facilitates synchronization of the image processing apparatus 30 and the signal processing system 50. The signal processing system 50 generally includes an analog to digital converter 54 for converting the video signal 65 into a digital signal 69 indicative of a given luminance level, a high speed digital processor 56 for detecting luminance levels indicative of the auxiliary optical command signal spot 27 on the screen 22, and a clock generator for developing the clock signal 67. The system 50 also includes a host computer interface 60 and an input/output processor 58 for facilitating communication between the system 50 and the host computer 14.

Considering now the digital signal processor 56 in greater detail with reference to FIG. 1, the processor 56 is coupled to the input/output processor 58 by a cable 53. The processor 56 is a model ADSP2105, as manufactured by Analog Devices Inc. and is fully described in the ADSP2102/ADSP2105 User's Manual, February 1990, for performing various high speed operations. The operations performed by the processor 56 are performed under the control of a set of algorithms 70A and 80A which each will be described hereinafter in greater detail.

Considering now the operation of the digital signal processor 56 with reference to FIGS. 4–7, the digital signal processor 56 is controlled by algorithms 70A and 80A which determine when video data should be acquired, determine differences in optical intensity values for processing, and process the differences in optical intensity values to detect the presence of the auxiliary optical command signal spot 27.

Figure 4:
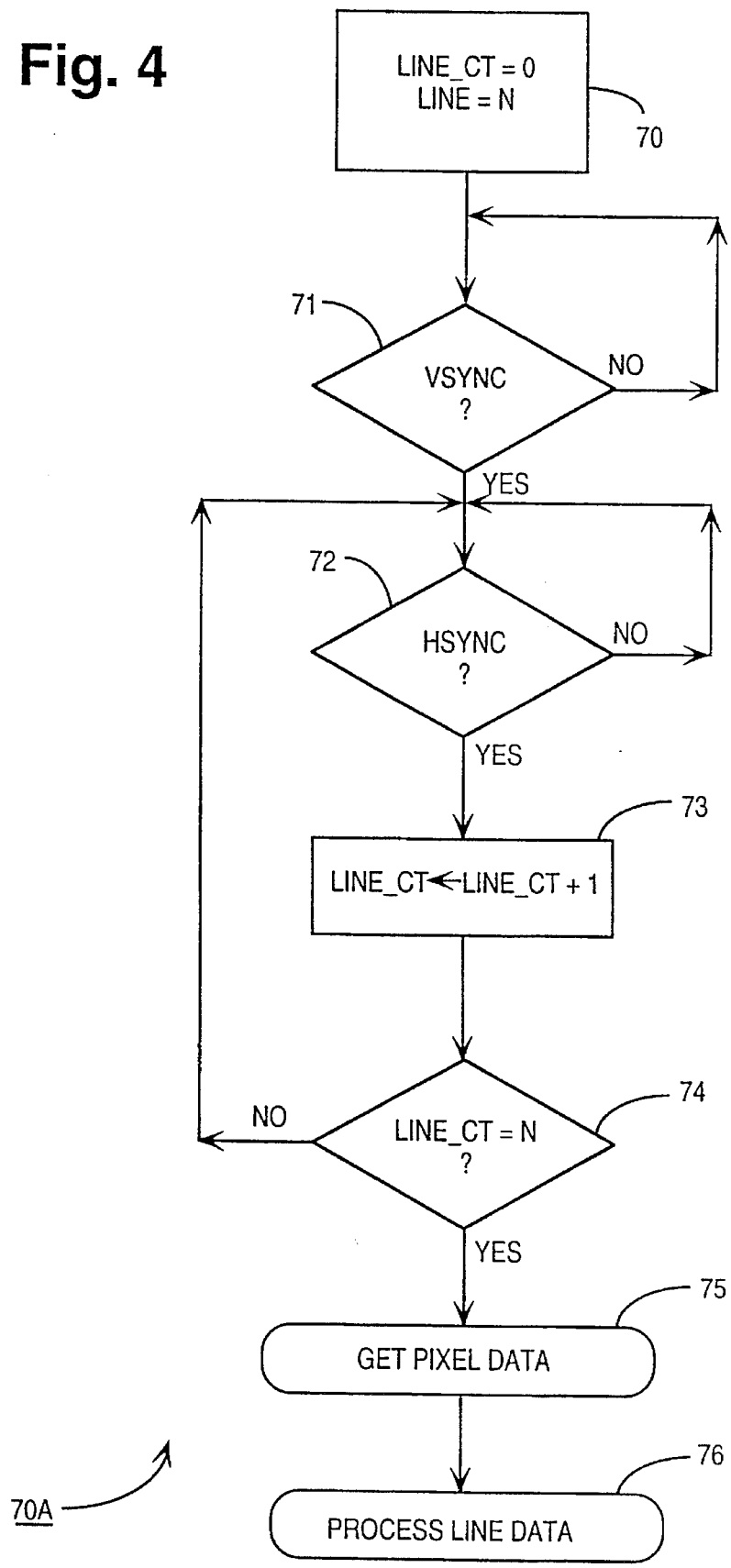
FIGS. 4–5 are firmware flow chart diagrams for a signal processing unit of the arrangement of FIG. 1.

Considering now the incrementing algorithm 70A in greater detail with reference to FIG. 4, the algorithm 70A enables the digital signal processor 56 to prepare for acquiring video data from the apparatus 30. The video data to be acquired corresponds to the horizontal line N received from the analog to digital converter 54 according to the present invention. The value of horizontal line N is dependent upon the total number of horizontal lines to be scanned.

Initialization of the incrementing algorithm 70A begins with instruction box 70 where a variable LINE_CT is cleared to 0 and a variable LINE is set to equal N. Next, the digital signal processor 56 awaits the beginning of a new scan sequence at decision box 71. The beginning of a new scan sequence is indicated by assertion of the VSYNC signal 61. If no VSYNC signal 61 is asserted, control returns to the decision box 71.

When the VSYNC signal 61 is asserted, the digital signal processor 56 awaits the assertion of the an HSYNC signal 63 at decision box 72. Assertion of the HSYNC signal 63 indicates that a new horizontal line is about to be acquired by the device 34. If no HSYNC signal 63 is asserted, control returns to decision box 72. However, if the HSYNC signal 63 is asserted, the program proceeds to an instruction box 73 which causes the LINE_CT to be incremented by 1. Next, decision box 74 determines whether the LINE_CT is equal to N, indicating that the desired horizontal line n has been reached. If LINE_CT is not equal to N, control returns to decision box 72 where the assertion of another HSYNC signal 63 is awaited. The return operation from decision box 74 to decision box 72 will continue until the desired horizontal line N is reached.

Once the desired horizontal line N has been reached, an ACQUISITION routine or GET PIXEL DATA routine 80A, described hereinafter in greater detail, is summoned at box 75. After acquisition is complete, control returns from acquisition routine 80A to the incrementing algorithm 70A. Thereafter, incrementing algorithm 70A continues to box 76 where the values obtained from the ACQUISITION routine 80A, are used to determine a differential intensity value D and to compare the differential intensity value D with threshold values.

Figure 5:
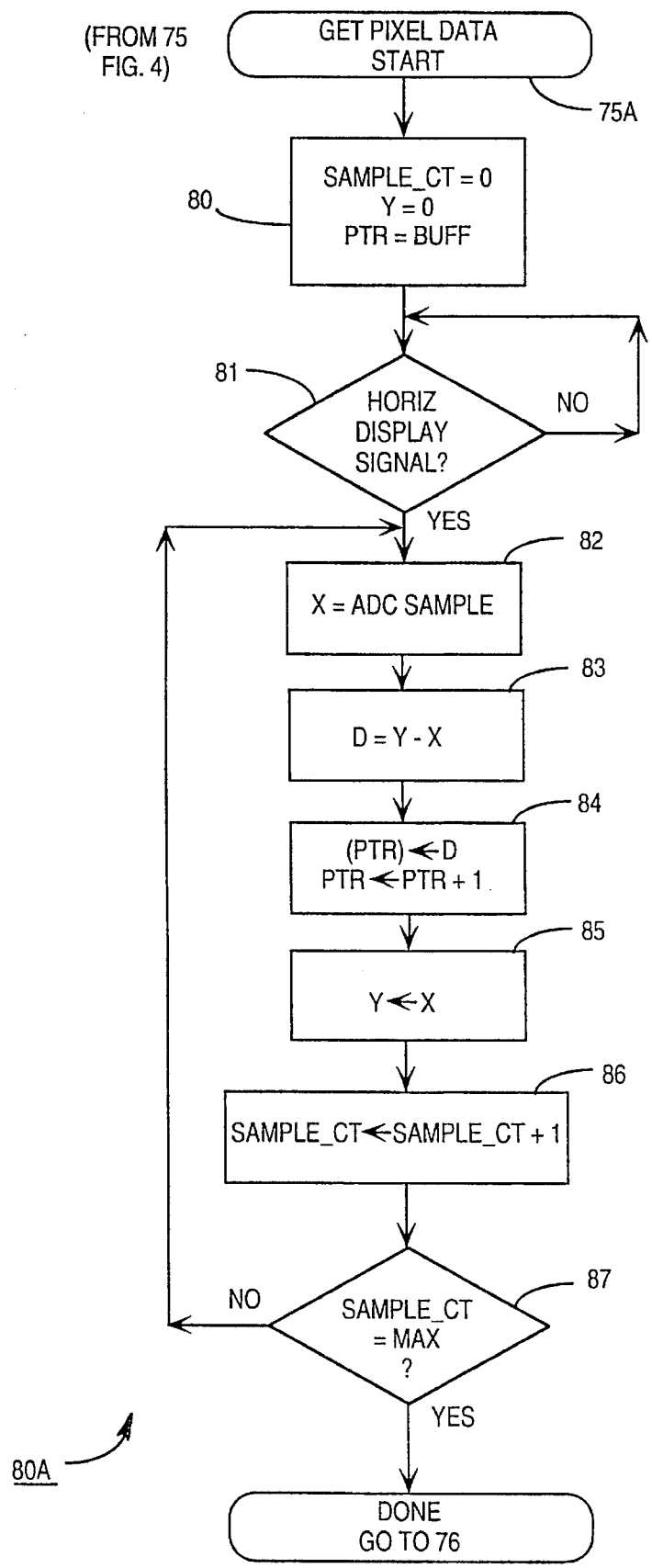

Considering now the ACQUISITION routine 80A in greater detail with reference to FIG. 5, the ACQUISITION routine 80A enables the digital signal processor 56 to acquire the horizontal line N and to store the differential intensity value D. Acquisition routine 80A, commences with a START command 75A which is entered from the incrementing algorithm 70A at box 75. The program then proceeds to a command instruction box 80 which initializes a sample count SAMPLE_CT, a previous pixel value Y and a memory pointer PTR. Further, memory pointer PTR is set to a memory location BUFF, which indicates a free area of random access memory (RAM) to be used as a buffer.

Routine 80A then proceeds to a decision box 81 where a determination is made as to whether or not a transmission of pixel data from the device 34 has begun. If transmission has not yet begun, control is returned to box 81 until such time that the transmission does begin.

Once transmission has begun, the program proceeds to an instruction command at box 82 which indicates that a pixel intensity value X is digitized by analog to digital converter 54 and stored. The value of the present pixel value X is then subtracted from the previous pixel value Y to determine the differential intensity value D in box 83. D is then stored, as indicted in instruction box 84, and memory pointer PTR is incremented by 1 to facilitate memory allocation.

Next the program goes to instruction box 85 which replaces the value stored as Y with the value stored as X, thereby making the present value now the previous value for the next intensity value comparison, as shown in box 83. SAMPLE_CT is incremented by 1 at box 87 before control continues to decision box 87, where SAMPLE_CT is tested as to whether all possible pixels on the sampled horizontal line N have been acquired. If all possible pixels have not been acquired, the routine returns to box 82 where another pixel intensity value X is digitalized. When all of the possible pixels have been acquired, the acquisition routine 80A returns control to the incrementing algorithm 70A at CALL instruction 76.

Figure 6:
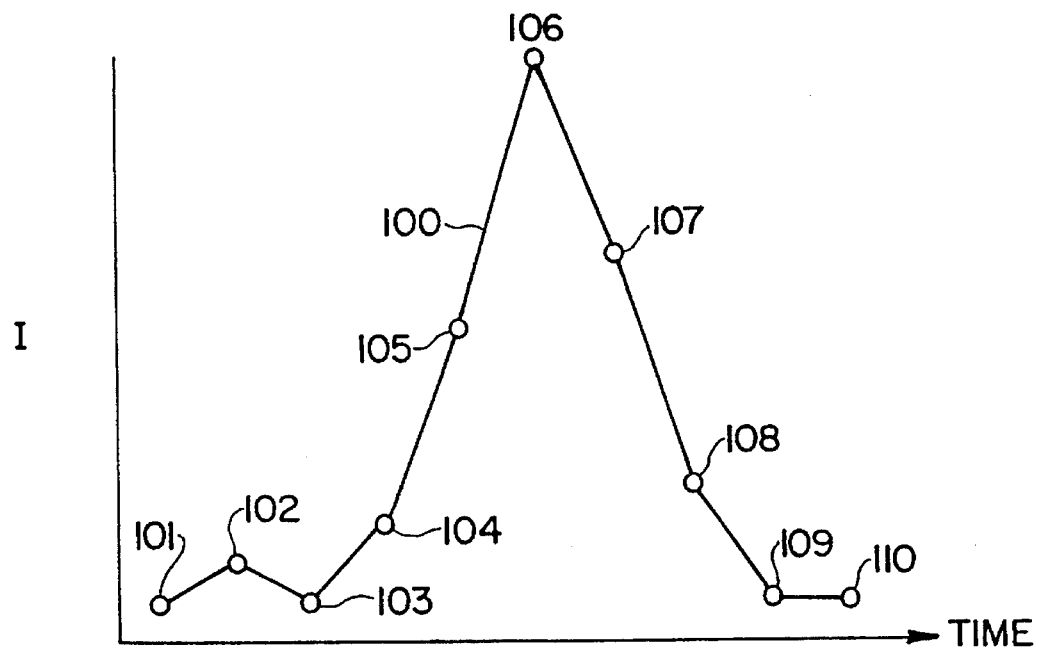
FIGS. 6–7 are intensity level versus time graphs depicting a typical detecting operation of the signal processing unit of the arrangement of FIG. 1.
Figure 7:
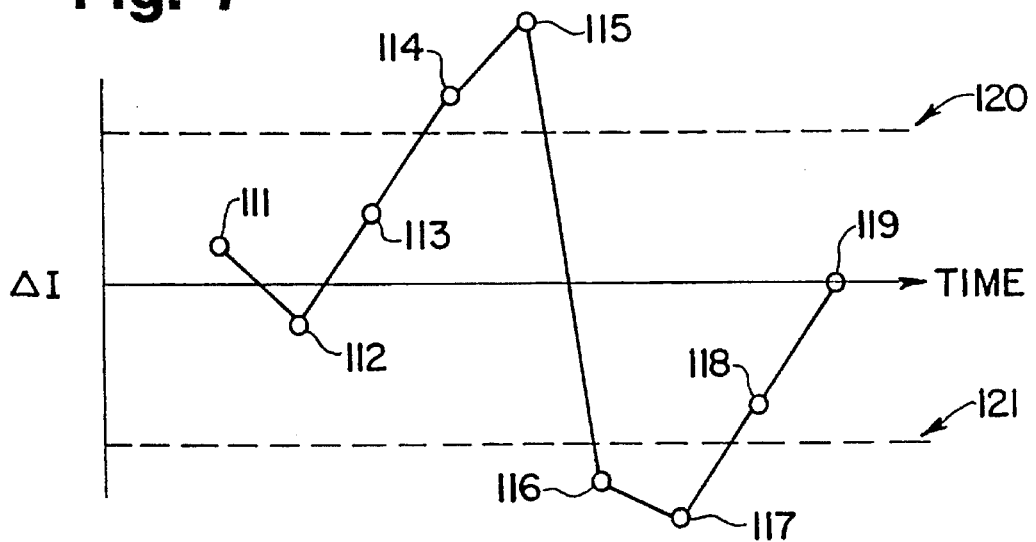

Considering now the processing of the differential intensity value D in greater detail, with respect to FIGS. 6 and 7, there is shown in FIG. 6 a graph which indicates individual pixel intensity values 101-110 for a typical horizontal line N. As the auxiliary optical command signal spot 27 is acquired by the signal processing system 50, the individual pixel intensity values 101-110will indicate an increase in intensity magnitude followed a decrease in intensity magnitude. The acquisition of the spot 27 is indicated in FIG. 6 as pixel intensity values 104-108.

FIG. 7 shows the differential intensity value D, as determined by acquisition routine 80A, for the pixel intensity values 101-110 acquired for horizontal line N. Each data point 111-119 represents the differential intensity value D of each previous sample and current sample. For example, intensity values 104 and 105 (FIG. 6) are +5 units apart. The corresponding data point 114 (FIG. 7), representing differential intensity value D, is shown as 5. Similarly, intensity values 107 and 108 (FIG. 6) are −6 units apart and the corresponding data point 117 (FIG. 7) is shown as −6.

Thus, FIG. 7 indicates that signal processing system 50 is an indicator for change in slope of a line 100 (FIG. 6) which represents the intensity values 101-110 acquired. When particular change in slope characteristic are calculated, the system 50 has detected the spot 27 and can then transmit this detection to the IOP58 for communication to the host computer 14.

Referring to FIG. 7, in operation, a positive threshold 120 and a negative threshold 121 are established, where the threshold 121 is the negative value of the threshold 120. The differential intensity values, such as data points 111-119, are calculated according to the processing described previously, but are not considered for spot detection purposes until a differential intensity value exceeds the positive threshold 130, such as data points 114 and 115, and is subsequently followed by a differential intensity value that is lower than negative threshold 121, such as data point 116. At this point, the signal processing system 50 has detected the spot 27 from surrounding reflected light and then transmits this information to the IOP 58 which translates the information to a form compatible for interfacing with the host computer 14.

The output of the digital signal processor 56 is coupled to the input/output processor 58, such as the SIGNETICS 87C652, to facilitate the communication of information processed by the signal processing system 50 to the host computer 14. A host computer interface 60 is coupled to the IOP 58 to permit transmission of data from the signal processing system 50 to the host computer 14 in a form which is compatible with the host computer 14. The data sent via the combination of the IOP 58 and the host computer interface 60 include a DATA DISPLAY signal, an ADB signal, and an RS232 signal.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. In an image projection arrangement including projection means for directing a projected image onto a remote viewing surface, light sensing means for detecting all wavelengths of light in the visible spectrum including the reflected projected image and ambient light, and an optical apparatus for generating a video image, a system for controlling the optical apparatus for generating a video image, comprising:

means for generating an optical control image having a predetermined optical wavelength and a given intensity level to modify the projected image;

means interposed between the remote viewing surface and the light sensing means for passing visible light within a narrow predetermined band of optical wavelengths only including the reflected projected image, ambient light and said optical control image;

signal means responsive to the light sensing means for generating an electrical signal indicative of the visible light having said narrow band of wavelengths;

signal modification means responsive to said signal means for determining a black level reference level to help generate a modified electrical signal indicative of the visible light having said narrow band of wavelengths and a peak intensity level substantially equal to the combination of the lowest intensity level of the projected image reflecting from the viewing surface and the highest intensity level of the control image reflecting from the viewing surface;

reference level means responsive to said modified electrical signal for determining a peak video image reference level, and a peak control image reference level and for establishing a reference level between said peak video image reference level and said peak control image reference level;

control means responsive to said electrical signal for generating a control signal indicative of a desired modification of the projected image whenever the electrical signal is greater than said reference level, said electrical signal being further indicative of visible light in said narrow band of wavelengths and having a peak intensity level that is at least greater than the highest intensity level of the protected image reflecting from the viewing surface; and means for modifying the projected image in response to said control signal.

2. A system according to claim 1, wherein said means for generating an optical control image is laser light generating means.

3. A system according to claim 2, wherein said laser light generating means is light emitting diode means.

4. A system according to claim 3, wherein said light emitting diode means includes:

a light emitting diode; and switch means for actuating said light emitting diode on and off to produce said control image for projection onto the viewing surface.

5. A system according to claim 1, wherein said means for producing visible light within the narrow band of optical wavelengths includes optical filter means that passes light having only said narrow band of optical wavelengths so that electrical discrimination of said control image is facilitated.

6. A system according to claim 5, wherein said optical means restricts said optical wavelengths to between about 600 nanometers and 740 nanometers.

7. A system according to claim 5, wherein said optical means restricts said optical wavelengths to between about 635 nanometers and 705 nanometers.

8. A system according to claim 5, wherein said optical means restricts said optical wavelengths to between about 660 nanometers and 680 nanometers.

9. A system according to claim 5, wherein said optical means restricts said optical wavelengths to about 670 nanometers.

10. A system according to claim 1, wherein said light sensing means is a camera means.

11. A system according to claim 1, wherein said light sensing means is a charge coupled means.

12. A system according to claim 11, wherein said charge coupled means is a charge coupled device.

13. A system according to claim 1, wherein said means for generating an optical control image includes means for generating an optical locating image for helping to locate said control image at a desired portion of the projected image; and wherein said locating image has an intensity level less than said predetermined intensity level so that said locating image can be distinguished from said control image.

14. A method for controlling an optical apparatus modifying a projected image, comprising:

generating an optical control image having a predetermined optical wavelength and a given intensity level to help modify the projected image;

producing in response to light reflecting from a remote viewing surface, visible light within a narrow predetermined band of optical wavelengths including light indicative of the projected image, ambient light, and light from said optical control image;

generating an electrical signal indicative of the visible light having said narrow band of wavelengths;

determining a black level reference level to help generate a modified electrical signal indicative of the visible light having said narrow band of wavelengths and a peak intensity level substantially equal to the combination of the lowest intensity level of the projected image reflecting from the viewing surface and the highest intensity level of the control image reflecting from the viewing surface;

determining a peak video image reference level, and a peak control image reference level;

establishing a reference level between said peak video image reference level and said peak control image reference level;

generating a control signal indicative of a desired modification of the projected image whenever the electrical signal is greater than said reference level, said electrical signal being further indicative of visible light in said narrow band of wavelengths and having a peak intensity level that is at least greater than the highest intensity level of the projected image reflecting from the viewing surface; and modifying the projected image in response to said control signal.

15. A method according to claim 14, wherein the step of generating includes:

generating an optical locating image for helping to locate said control image at a desired portion of the projected image; and wherein said locating image has an intensity level less than said predetermined intensity level so that said locating image can be distinguished from said control image.

16. A calibration method for an optical input device for a display apparatus controlled by a control light having optical wavelengths in only a narrow band range, comprising:

using the display apparatus to project a calibration video image onto a remote viewing surface;

detecting a predetermined narrow band of optical wavelengths of light reflected from the viewing surface;

determining the value of the maximum video intensity of the reflected wavelengths of light;

storing the maximum intensity value thereof;

establishing a reference level value at a level substantially greater than the stored maximum intensity value and substantially less than the combination of the value of the maximum video intensity and a maximum value of control light directed onto and reflecting from the video image;

said maximum video intensity value being the maximum intensity level value of only that portion of light reflecting from a remote viewing surface indicative of a projected video image having wavelengths in only a narrow band range;

said maximum control light value being the combination of the minimum intensity level value of only that portion of light reflecting from said remote viewing surface indicative of said projected video image having wavelengths in only the narrow band range and the maximum control light intensity value having wavelengths in only said narrow band range, where the control light is reflecting from the last mentioned portion of said projected video image; and generating a control signal whenever the value of said detection signal is greater than said reference level value, said control signal indicative of at least a detected video image coordinate location for helping to control the display.

17. A method of controlling a display according to claim 16, wherein the step of establishing includes:

generating a bright video image and projecting it onto a remote viewing surface, wherein the projected video image reflecting from said remote surface has a maximum intensity level and a minimum intensity level;

detecting light reflecting from the remote surface having wavelengths in only a narrow band range, said light including ambient light having all visible wavelengths;

generating an electrical signal in response to the step of detecting, said electrical signal being indicative of light reflecting from the remote surface and having wavelengths in only said narrow band range;

determining that portion of the electrical signal indicative of only that portion of the projected video image having wavelengths in said narrow band range;

determining said peak video image reference level indicative of the maximum intensity level of only that portion of the projected image with wavelength in only said narrow band range.

18. A method according to claim 17, wherein the step of establishing further includes:

using a control light having wavelengths in only said narrow band range;

directing said control light onto that portion of the projected video image having said minimum intensity level;

repeating the step of detecting;

generating another electrical signal in response to the last mentioned step of detecting, said another electrical signal being indicative of light in only said narrow band range; and determining in response to said another electrical signal said peak control image reference level indicative of the combination of the minimum intensity level of the projected video image with wavelengths in only said narrow band range and the maximum intensity level of the control light having wavelengths in only said narrow band range.

19. A method of controlling a display according to claim 18, wherein the step of generating a control signal includes repeating the step of detecting.

20. A system for calibrating an optical input device for a display apparatus controlled by a control light having optical wavelengths in only a narrow band range, comprising:

means for detecting a predetermined narrow band of optical wavelengths of light reflected from the viewing surface;

means for determining the value of the maximum video intensity level of the reflected wavelengths of light;

means for storing the maximum intensity thereof;

means for establishing a reference level value, at a level substantially greater than the stored maximum intensity value and substantially less than the combination of the value of the maximum video intensity value and a maximum value of control light directed onto and reflecting from the video image;

said maximum video intensity value being the maximum intensity level value of only that portion of light reflecting from a remote viewing surface indicative of a projected video image having wavelengths in only a narrow band range;

said maximum control light value being the combination of the minimum intensity level value of only that portion of light reflecting from said remote viewing surface indicative of said projected video image having wavelengths in only the narrow band range and the maximum control light intensity value having wavelengths in only the narrow band range, where the control light is reflecting from the last mentioned portion of said projected video image; and means for generating a control signal whenever the value of said detection signal is greater than said reference level value, said control signal indicative of at least a detected video image coordinate location for helping to control the display.

21. An auxiliary optical command arrangement for a liquid crystal display system for projecting an image onto a surface, comprising:

optical sensing means for receiving incoming light indicative of a reflected projected image, a reflected auxiliary command image having a narrow band of optical wavelengths, and extraneous light including reflected and direct ambient light of different intensities and optical wavelengths;

an auxiliary light command device for generating an auxiliary light command image having a narrow wavelength band to help discriminate the command image from all other light incident upon said optical sensing means;

optical attenuation means for filtering the incoming light being received by said optical sensing means to pass only said narrow band of optical wavelengths to facilitate the detection of said auxiliary command image by said optical sensing means so that said sensing means can detect received light in said narrow band;

said optical sensing means generating an electrical output signal indicative of light only having wavelengths substantially within said narrow band of optical wavelengths;

differential means responsive to said output signal for determining a differential intensity value of the light sensed by said optical sensing means; and discrimination means for detecting when said differential intensity value exceeds a positive threshold amount and substantially immediately thereafter decreases more than a negative threshold amount to discriminate against reflected projected image light and extraneous light so that only auxiliary light command images can be detected.

22. An auxiliary optical command arrangement according to claim 21, wherein said optical attenuation means restricts said optical wavelengths to between about 600 nanometers and 740 nanometers.

23. An auxiliary optical command arrangement according to claim 21, wherein said optical attenuation means restricts said optical wavelengths to between about 635 nanometers and 705 nanometers.

24. An auxiliary optical command arrangement according to claim 21, wherein said optical attenuation means restricts said optical wavelengths to between about 660 nanometers and 680 nanometers.

25. An auxiliary optical command arrangement, according to claim 21, wherein said auxiliary command image has a wavelength band between about 665 nanometers and 675 nanometers.

26. An auxiliary optical command arrangement, according to claim 21, wherein said auxiliary command image has a wavelength band centered at about 670 nanometers.

27. An auxiliary optical arrangement according to claim 21, further comprising:

mounting means connected to said sensing means for supporting it movably to enable it to be adjusted positionally relative to a viewing area on the surface so that said sensing means can be aligned with the viewing area;

a light source mounted to said optical sensing means for projecting an alignment image onto the viewing area to facilitate adjustment of said optical sensing means to an aligned position;

electrical switch means coupled to said light source for activating it to project the alignment image generally toward the viewing area so that said sensing means and said light source can be moved adjustably by employing said mounting means until the alignment image is positioned generally at a central portion of the viewing area;

whereby said optical sensing means is properly aligned with the viewing area to sense optically the entire projected image.

28. An auxiliary optical arrangement according to claim 27, wherein said optical attenuation means includes lens means having an optical center to direct incoming light.

29. An auxiliary optical arrangement according to claim 28, wherein said light source is mounted substantially on a horizontal optical axis of said lens means and in close proximity to said optical center.

30. An auxiliary optical arrangement according to claim 28, wherein said light source is a light emitting diode.

31. An auxiliary optical arrangement according to claim 29, wherein said light source is a laser.

32. An optical input arrangement according to claim 21, wherein said optical sensing means includes a video camera.

33. An auxiliary optical command arrangement according to claim 21, wherein said discrimination means includes a digital signal processor.

34. An auxiliary optical command arrangement according to claim 27, wherein said light source is a laser light source having a narrow band of optical wavelengths; and wherein said alignment image is an auxiliary command image.

35. A method of using an auxiliary optical command arrangement for controlling a liquid crystal display system for projecting an image onto a surface, comprising:

receiving incoming light indicative of a reflected projected image, a reflected auxiliary command image having a narrow band of optical wavelengths, and extraneous light including reflected and direct ambient light of different intensities and optical wavelengths;

directing an auxiliary light command image having a narrow wavelength band onto the surface and the projected image thereon to help discriminate the command image from all other light;

optically filtering the incoming light being received to pass only said narrow band of optical wavelengths to facilitate the detection of said auxiliary command image;

generating an electrical output signal indicative of light only having wavelengths substantially within said narrow band of optical wavelengths;

detecting when an intensity value exceeds a positive threshold amount and substantially immediately thereafter decreases more than a negative threshold amount to discriminate against reflected projected image light and extraneous light so that only auxiliary light command images can be detected.

36. A method of using an auxiliary optical command arrangement for controlling a liquid crystal display system for projecting an image onto a surface, according to claim 35 further comprising:

using optical sensing means;

sensing optically a projected image, said image having an associated viewing area on the surface to generate electrical command signals for controlling the display system;

using a light source for producing an alignment image;

projecting said alignment image onto the viewing area to facilitate adjustment of said optical sensing means to an aligned position;

activating said light source to project the alignment image generally toward the viewing area so that said sensing means and said light source can be moved adjustably until the alignment image is positioned generally at a central portion of the viewing area;

whereby said optical sensing means is properly aligned with the viewing area to sense optically the entire projected image.

37. A system for calibrating an optical input device for a display apparatus controlled by a control light having optical wavelength in only a narrow band range, said control light for reflecting from a viewing surface, comprising:

means for filtering light reflecting from the viewing surface to enable only a predetermined narrow band of optical wavelengths of light to be detected, said light reflecting from the viewing surface including light from the projected video image, the control light and background light;

means for generating a video signal indicative of the combination of the filtered projected video image and the filtered background light to facilitate discriminating accurately the projected video image from the background light reflecting from the viewing surface, said video signal having a minimum value and a maximum value;

means for determining the minimum value of said video signal to facilitate the elimination of a portion of said video signal indicative of the background light;

means for storing the determined minimum value to facilitate modifying said video signal thereafter for calibration purposes;

means for decreasing said video signal by the stored minimum value to generate a modified video signal indicative of the projected video image only, said modified video signal having a minimum value and a maximum value; and means for determining a reference level signal greater than said modified video signal to distinguish a signal indicative of an auxiliary light image from said modified video signal to help the optical input system detect the control image on the viewing surface.

* * * * *